US006357326B1

(12) United States Patent
David

(10) Patent No.: US 6,357,326 B1
(45) Date of Patent: Mar. 19, 2002

(54) SHAPE OUTLINING DEVICE

(76) Inventor: James D. David, P.O. Box 187, Bloomington, CA (US) 92316

( * ) Notice: Subject to any disclaimer, the term of this patent is extended or adjusted under 35 U.S.C. 154(b) by 50 days.

(21) Appl. No.: 09/607,353

(22) Filed: Jun. 30, 2000

(51) Int. Cl.[7] .................................................. B23B 3/28

(52) U.S. Cl. ................................ 82/19; 82/11.1; 82/73; 82/128; 409/125

(58) Field of Search .............................. 82/19, 18, 11.1, 82/1.3, 1.5, 65, 70.1, 76, 78, 73, 86, 92, 128; 408/153, 154, 155, 156, 173; 409/125, 130

(56) References Cited

U.S. PATENT DOCUMENTS

D102,387 S 12/1936 Moses
2,499,673 A 3/1950 Olejniczak
3,138,046 A * 6/1964 Vaucher ........................ 82/137
3,752,037 A * 8/1973 Hoglund ...................... 409/289
4,210,038 A * 7/1980 Hill ................................ 82/11
4,584,915 A * 4/1986 Ichiyanagi et al. ............ 82/19
4,878,409 A 11/1989 Carithers, Jr.
5,014,436 A 5/1991 Kozyrski et al.
5,065,517 A 11/1991 Markes
5,596,809 A 1/1997 Beard

* cited by examiner

*Primary Examiner*—Henry Tsai

(57) ABSTRACT

A shape outlining device for a user to easily mark or cut a predetermined shape on a surface. The shape outlining device includes a post assembly with a lower end for resting on a surface and an upper free end. A spool base has a central shaft with an upper and lower flange. A cam with a profile surface for determining a shape to be outlined on the surface is removably mounted on the central shaft of the spool base. The cam has a central passage through which the central shaft is received with the cam resting on the upper flange of the post assembly. A spool grip is placed over the spool base for permitting hand gripping of the post assembly. The spool grip has an upper and lower flange, and a sleeve with a central aperture that receives the central shaft of the spool base. An arm assembly is removably and rotatably mounted on the post assembly by way of a central tube member that receives and rides on the flanges of the spool base and the spool grip. The arm assembly has a rod with a cam follower and an adjustable blade holding carriage that cuts a shape on the surface that corresponds to the profile shape of the cam.

20 Claims, 3 Drawing Sheets

SHAPE OUTLINING DEVICE

BACKGROUND OF THE INVENTION

1. Field of the Invention

The present invention relates to shape outlining cutters and more particularly pertains to a new shape outlining device for permitting a user to easily cut or mark a predetermined shape on a surface.

2. Description of the Prior Art

The use of shape outlining cutters is known in the prior art. More specifically, shape outlining cutters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,596,809; 5,065,517; 5,014,436; 4,878,409; 2,499,673; and U.S. Pat. No. Des. 102,387.

While these devices fulfill their respective, particular objectives and requirements, the aforementioned patents do not disclose a new shape outlining device. The inventive device includes a post assembly with a lower end for resting on a surface and an upper free end. A spool base has a central shaft with an upper and lower flange. A cam with a profile surface for determining a shape to be outlined on the surface is removably mounted on the central shaft of the spool base. The cam has a central passage through which the central shaft is received with the cam resting on the upper flange of the post assembly. A spool grip is placed over the spool base for permitting hand gripping of the post assembly. The spool grip has an upper and lower flange, and a sleeve with a central aperture that receives the central shaft of the spool base. An arm assembly is removably and rotatably mounted on the post assembly by way of a central tube member that receives and rides on the flanges of the spool base and the spool grip. The arm assembly has a rod with a cam follower and an adjustable blade holding carriage that cuts a shape on the surface that corresponds to the profile shape of the cam.

In these respects, the shape outlining device according to the present invention substantially departs from the conventional concepts and designs of the prior art, and in so doing provides an apparatus primarily developed for the purpose of a user to easily mark or cut a predetermined shape on a surface.

SUMMARY OF THE INVENTION

In view of the foregoing disadvantages inherent in the known types of shape outlining cutters now present in the prior art, the present invention provides a new shape outlining device construction wherein the same can be utilized for a user to easily mark or cut a predetermined shape on a surface.

The general purpose of the present invention, which will be described subsequently in greater detail, is to provide a new shape outlining device apparatus and method which has many of the advantages of the shape outlining cutters mentioned heretofore and many novel features that result in a new shape outlining device which is not anticipated, rendered obvious, suggested, or even implied by any of the prior art shape outlining cutters, either alone or in any combination thereof.

To attain this, the present invention generally comprises a post assembly with a lower end for resting on a surface and an upper free end. A spool base has a central shaft with an upper and lower flange. A cam with a profile surface for determining a shape to be outlined on the surface is removably mounted on the central shaft of the spool base. The cam has a central passage through which the central shaft is received with the cam resting on the upper flange of the post assembly. A spool grip is placed over the spool base for permitting hand gripping of the post assembly. The spool grip has an upper and lower flange, and a sleeve with a central aperture that receives the central shaft of the spool base. An arm assembly is removably and rotatably mounted on the post assembly by way of a central tube member that receives and rides on the flanges of the spool base and the spool grip. The arm assembly has a rod with a cam follower and an adjustable blade holding carriage that cuts a shape on the surface that corresponds to the profile shape of the cam.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shape outlining device apparatus and method which has many of the advantages of the shape outlining cutters mentioned heretofore and many novel features that result in a new shape outlining device which is not anticipated, rendered obvious, suggested, or even implied by any of the prior art shape outlining cutters, either alone or in any combination thereof.

It is another object of the present invention to provide a new shape outlining device which may be easily and efficiently manufactured and marketed.

It is a further object of the present invention to provide a new shape outlining device which is of a durable and reliable construction.

An even further object of the present invention is to provide a new shape outlining device which is susceptible of a low cost of manufacture with regard to both materials and labor, and which accordingly is then susceptible of low prices of sale to the consuming public, thereby making such shape outlining device economically available to the buying public.

Still yet another object of the present invention is to provide a new shape outlining device which provides in the apparatuses and methods of the prior art some of the advantages thereof, while simultaneously overcoming some of the disadvantages normally associated therewith.

Still another object of the present invention is to provide a new shape outlining device for a user to easily mark or cut a plurality of predetermined shapes on a surface.

Yet another object of the present invention is to provide a new shape outlining device which includes a post assembly with a lower end for resting on a surface and an upper free end. A spool base has a central shaft with an upper and lower flange. A cam with a profile surface for determining a shape to be outlined on the surface is removably mounted on the central shaft of the spool base. The cam has a central passage through which the central shaft is received with the cam resting on the upper flange of the post assembly. A spool grip is placed over the spool base for permitting hand gripping of the post assembly. The spool grip has an upper and lower flange, and a sleeve with a central aperture that receives the central shaft of the spool base. An arm assembly is removably and rotatably mounted on the post assembly by way of a central tube member that receives and rides on the flanges of the spool base and the spool grip. The arm assembly has a rod with a cam follower and an adjustable blade holding carriage that cuts a shape on the surface that corresponds to the profile shape of the cam.

Still yet another object of the present invention is to provide a new shape outlining device that will allow a user to easily mark or cut various shapes and sizes onto a surface by resting the device on the surface and rotating an arm assembly around a post assembly of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
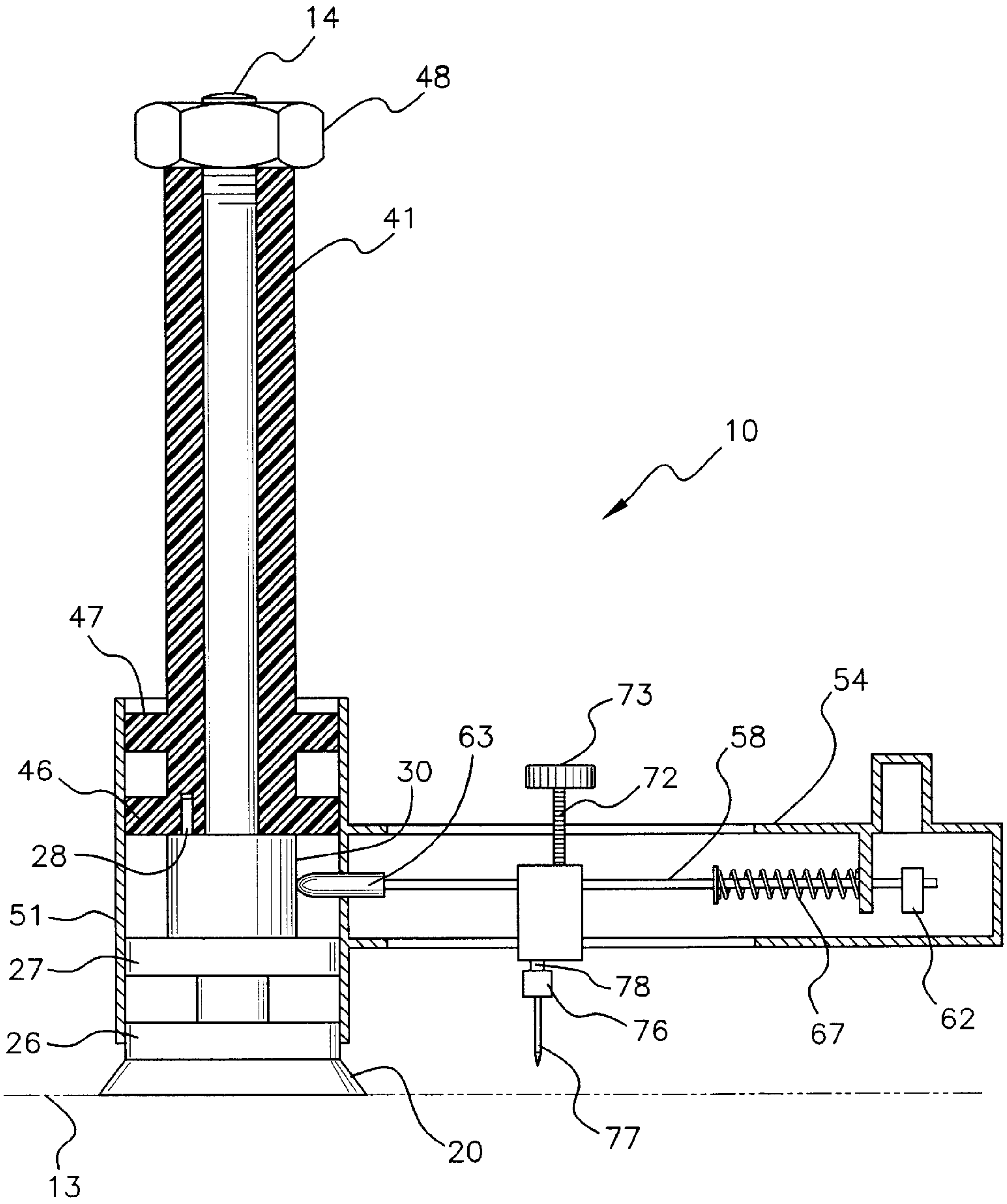
FIG. 1 is a schematic side view of a new shape outlining device according to the present invention.
Figure 2:
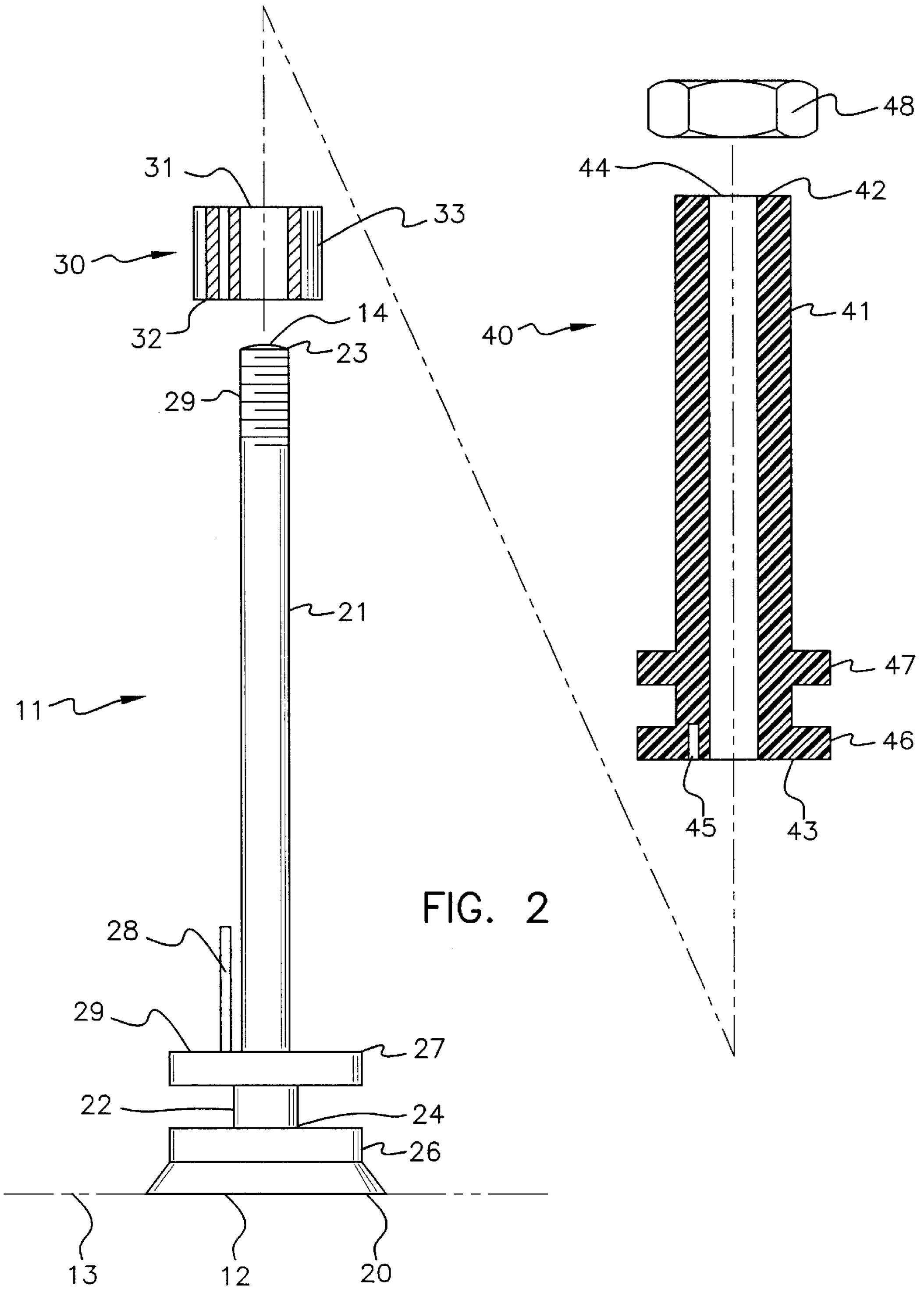
FIG. 2 is a schematic expanded view of the post assembly, according to the present invention.
Figure 3:
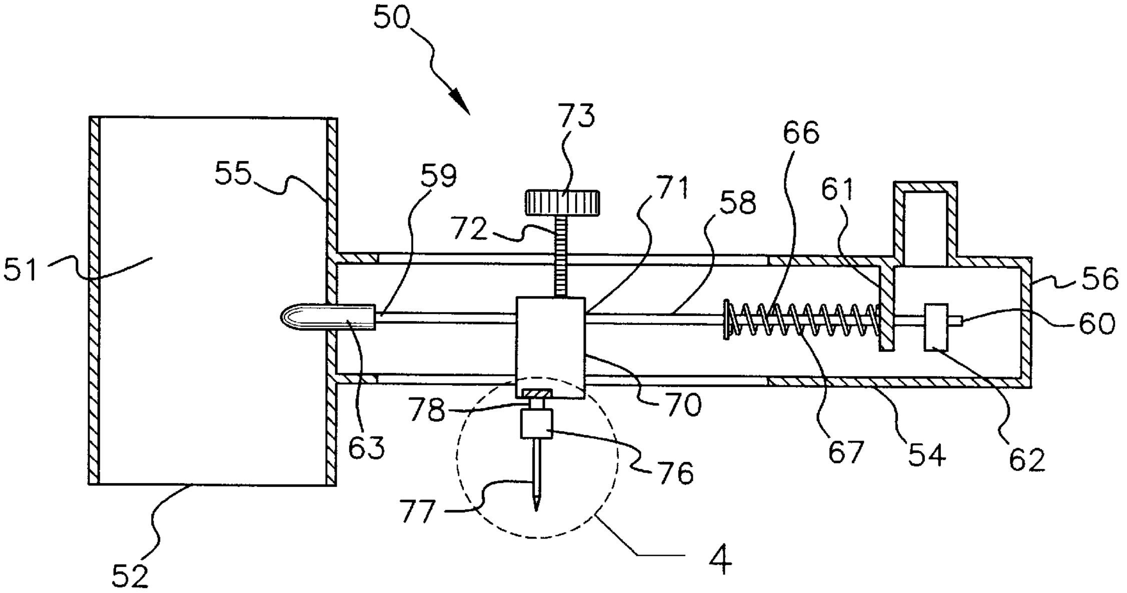
FIG. 3 is a schematic side view of the arm assembly according to the present invention.
Figure 4:
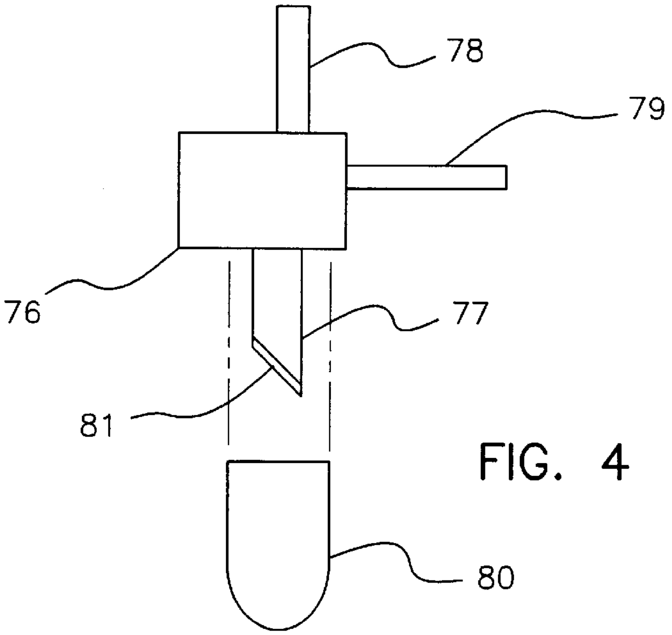
FIG. 4 is a schematic expanded view of blade assembly according to the present invention.

With reference now to the drawings, and in particular to FIGS. 1 through 4 thereof, a new shape outlining device embodying the principles and concepts of the present invention and generally designated by the reference numeral 10 will be described.

As best illustrated in FIGS. 1 through 4, the shape outlining device 10 generally comprises a post assembly 11 having an elongate shape with a lower end 12 for resting on a surface 13 and an upper free end 14.

A spool bootie 20 is located at the lower end 12 of the post assembly 11. The spool bootie 20 is restable on the surface 13. A spool base 21 extends upwardly from the spool bootie 20 and away from the surface 13. The spool base 21 has a central shaft 22 with an upper end 23 and a lower end 24. The spool base 21 has a lower flange 26 at the lower end 24 of the central shaft 22. The lower flange 26 extends radially outward from the central shaft 22. The lower flange 26 has a circular perimeter shape. The spool base 21 has an upper flange 27 spaced upwardly from the lower flange 26. The upper flange 27 extends radially outward from the central shaft 22. The upper flange 27 has a circular perimeter shape. The spool base 21 has a locking pin 28 mounted to an upper surface 29 of the upper flange 27. The locking pin 28 is at a location spaced from the central shaft 22. The locking pin 28 extends parallel to the central shaft 22. An upper portion 29 of the spool base 21 adjacent the upper end 23 of the spool base 21 has external threads thereon.

A cam 30 is used to determine a shape to be traced on the surface 13. The cam 30 is removably mounted on the central shaft 22 of the spool base 21. The cam 30 has a central passage 31 through which the central shaft 22 is received. The cam 30 has a secondary passage 32 spaced radially outward from the central passage 31. The secondary passage 32 receives the locking pin 28 of the spool base 21 when the cam 30 is positioned adjacent to the upper surface 29 of the upper flange 27 of the spool base 21. The cam 30 has a profile surface 33 corresponding to a shape to be traced on the surface 13. The cam 30 has a profile shape 33 that is selected from the group consisting of a heart, a circle, an oval, a square, a star, a pentagon, a triangle, and a diamond.

A spool grip 40 receives the spool base 21. The spool grip 40 has an elongate sleeve 41 with an upper end 42 and a lower end 43. The sleeve 41 has a central aperture 44 that receives the central shaft 22 of the spool base 21. The spool grip 40 at the lower end 43 of the sleeve 41 has a cavity 45 that receives the locking pin 28 of the spool base 21. The spool grip 40 has a lower flange 46 at the lower end 43 of the sleeve 41 for resting on the cam 30. The lower flange 46 extends radially outward from the sleeve 41 and has a circular perimeter shape. The spool grip 40 has an upper flange 47 that extends radially outward from the sleeve 41 and has a circular perimeter shape.

A nut 48 is removably secured to the upper end 23 of the central shaft 22 of the spool base 21. The nut 48 is used to hold the cam 30 and spool grip 40 to the spool base 21.

An arm assembly 50 is removably and rotatably mounted on the post assembly 11. The arm assembly 50 has a central tube member 51 mounted to the post assembly 11. The central tube member 51 has a lumen 52 that receives and rides on the flanges 26, 27, 46 and 47 of the spool base 21 and the spool grip 40 such that the tube member 51 is rotatable about the flanges 26, 27, 46 and 47. An arm 54 has an elongate shape with an inner end 55 and an outer end 56. The inner end 55 of the arm 54 is mounted to an outer surface 57 of the tube member 51. A rod 58 is mounted on the arm 54 in a substantially parallel orientation to the arm 54. The rod 58 is mounted to permit axial movement of the rod 58 with respect to the arm 54. The rod 58 has an inner end 59 and an outer end 60. The rod 58 is mounted to the arm 54 by a support 61. The rod 58 has a stop 62 mounted thereon at a location between the inner 59 and outer 60 ends. A cam follower 63 is mounted on the inner end 59 of the rod 58. The cam follower 63 abuts against the profile surface 33 of the cam 30 such that the rod 58 is axially movable by the profile surface 33 of the cam 30 as the arm assembly 50 is rotated around the post assembly 11.

A biasing member 66 is used for biasing the rod 58 axially inward toward and into contact with the profile surface 33 of the cam 30. The biasing member 66 has a compression spring 67 mounted between the stop 62 on the rod 58 and the support 61. The spring 67 has the rod 58 passing through the spring 67.

A carriage 70 is mounted on the rod 58 in a manner permitting sliding movement of the carriage 70 in an axial direction along the rod 58 for permitting adjustment of the size of the shape to traced. The carriage 70 has a channel 71 through which the rod 58 slidably extends. A locking screw 72 is threadedly mounted on the carriage 70 and is adapted for bearing against the rod 58. The locking screw 72 locks the carriage 70 against axial movement relative to the rod 58. The locking screw 72 has a knob 73 thereon for permitting finger rotation of the locking screw 72.

For cutting the surface on which the shaped is traced, blade holder 76 is mounted on the carriage 70, with a blade 77 removably mounted thereon. The blade holder 76 is rotatably mounted on the carriage 70 for permitting rotation of the orientation of the blade 77. The blade holder 76 has a pivot pin 78 rotatably extending into a hole in the carriage 70. The blade holder 76 has a blade directional knob 79 for permitting finger pivoting of the blade holder 76 on the pivot pin 78.

A blade safety cap 80 is removably mounted on the blade 77 for protecting a cutting edge 81 of the blade 77 from unintentional contact.

The cam may have a profile corresponding to (for the purpose of creating the shape of) various different shapes, which may include, but are not limited to, a group including a heart, a circle, an oval, a square, a star, a pentagon, a triangle, a diamond, a teardrop balloon, a hexagon, a ruffled oval, a ruffled circle, a bell tulip, a star, a flower, an octagon, a ruffled heart, and a ruffled square. It should be realized that other shapes may also be created using the inventive device.

In use, the present invention would allow a user to easily outline a shape on the surface 13 for drawing the shape or cutting the shape into the surface 13. The post assembly 11 would be placed on the surface 13 with the spool bootie 20 resting on the surface 13. The cam 30 would be placed over the post assembly 11 so that the cam 30 rests on the upper surface 29 of the upper flange 27 of the spool base 21. The spool grip 40 would then be placed over the post assembly 11 so that the lower flange 46 of the spool grip 40 rests on the cam 30. The user would place the arm assembly 50 over the post assembly 11, the cam 30 and the spool grip 40 such that the cam follower 63 abuts against the cam 30. The user would then rotate the arm assembly 50 so that a shape would be cut into the surface 13. The shape would correspond to the profile shape 33 of the cam 30.

Optionally, the blade 77 may be replaced with a marking device (such as, for example, a pencil lead) for marking various shapes of various sizes on the surface rather than cutting into the surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shape outlining device for outlining a predetermined shape on a surface, the device comprising:

a post assembly with a lower end for resting on a surface and an upper free end, the post assembly comprising:

a spool base, the spool base having a central shaft with an upper end and a lower end, the spool base having an upper flange;

a cam for determining a shape to be outlined on the surface, the cam having a central passage through which the central shaft is received, the cam resting on the upper flange of the post assembly, the cam having a profile surface corresponding to a shape to be cut into the surface;

an arm assembly removably and rotatably mounted on the post assembly, the arm assembly comprising:

a central tube member mounted to the post assembly, the central tube having a lumen receiving and riding on the flanges of the spool base such that the tube member is rotatable about the flanges;

an arm having an inner end and an outer end, the inner end of the arm being mounted to an outer surface of the tube member;

a rod mounted on the arm in a substantially parallel orientation to the arm, the rod being mounted to permit axial movement of the rod with respect to the arm, the rod having an inner end and an outer end;

a cam follower mounted on the inner end of the rod, the cam follower abutting against the profile surface of the cam such that the rod is axially movable by the profile surface of the cam as the arm assembly is rotated around the post assembly;

a carriage mounted on the rod in a manner permitting sliding movement of the carriage in an axial direction along the rod; and a blade holder mounted on the carriage, the blade holder having a blade mounted thereon;

wherein the cam is removably mounted on the central shaft of the spool base for permitting replacement of the cam with cams of different shapes.

2. A shape outlining device as set forth in claim 1 wherein the spool base has a lower flange at the lower end of the central shaft spaced downwardly from the upper flange.

3. A shape outlining device as set forth in claim 2 wherein the lower flange of the spool base extends radially outward from the central shaft and has a circular perimeter shape.

4. A shape outlining device as set forth in claim 1 further comprising a spool grip for permitting hand gripping of the post assembly, the spool grip receiving the spool base, the spool grip having a sleeve with an upper end and a lower end, the sleeve having a central aperture for receiving the central shaft of the spool base, the spool grip having a lower flange at the lower end of the sleeve for resting on the cam and an upper flange.

5. A shape outlining device as set forth in claim 4 wherein the spool base has a locking pin mounted to an upper surface of the upper flange at a location spaced from the central shaft, the locking pin extends parallel to the central shaft, the cam has a secondary passage for receiving the locking pin of the spool base when the cam is positioned adjacent to the upper surface of the upper flange of the spool base, and the lower end of the spool grip has a cavity for receiving the locking pin of the spool base.

6. A shape outlining device as set forth in claim 1 further comprising a spool bootie located at the lower end of the post assembly for resting on the surface.

7. A shape outlining device as set forth in claim 1 wherein the upper flange of the spool base extends radially outward from the central shaft, the upper flange has a circular perimeter shape.

8. A shape outlining device as set forth in claim 1 wherein the spool base has an upper portion adjacent the upper end of the spool base, the upper end has external threads thereon.

9. A shape outlining device as set forth in claim 8 further comprising a nut removably secured to the upper end of the central shaft of the spool base for holding the cam to the spool base.

10. A shape outlining device as set forth in claim 4 wherein the lower flange of the spool grip extends radially outward from the sleeve and has a circular perimeter shape.

11. A shape outlining device as set forth in claim 4 wherein the upper flange of the spool grip extends radially outward from the sleeve and has a circular perimeter shape.

12. A shape outlining device as set forth in claim 1 wherein the rod being mounted to the arm by a support, the rod having a stop mounted at a location between the inner and outer ends.

13. A shape outlining device as set forth in claim 1 further comprising a biasing member for biasing the rod axially inward toward and into contact with the profile surface of the cam.

14. A shape outlining device as set forth in claim 13 wherein the biasing member comprises a compression spring mounted between the stop on the rod and the support, the spring having the rod passing through the spring.

15. A shape outlining device as set forth in claim 1 wherein the carriage has a channel through which the rod slidably extends.

16. A shape outlining device as set forth in claim 1 further comprising a locking screw threadedly mounted on the carriage and being adapted for bearing against the rod for locking the carriage against axial movement relative to the rod.

17. A shape outlining device as set forth in claim 16 wherein the locking screw has a knob thereon for permitting finger rotation of the locking screw.

18. A shape outlining device as set forth in claim 1 wherein the blade holder being rotatably mounted on the carriage for permitting rotation of the orientation of the blade, the blade holder having a pivot pin rotatably extending into a hole in the carriage, and the blade holder having a blade directional knob for permitting finger pivoting of the blade holder on the pivot pin.

19. A shape outlining device as set forth in claim 1 further comprising a blade safety cap, the blade safety cap being removably mountable on the blade for protecting a cutting edge of the blade from unintentional contact with the cutting edge.

20. A shape outlining device for outlining a predetermined shape on a surface, the shape outlining device comprising:

a post assembly having an elongate shape with a lower end for resting on a surface and an upper free end, the post assembly comprising:

a spool bootie located at the lower end of the post assembly for resting on the surface;

a spool base extending upwardly from the spool bootie and away from the surface, the spool base having a central shaft with an upper end and a lower end, the spool base having a lower flange at the lower end of the central shaft, the lower flange extending radially outward from the central shaft, the lower flange having a circular perimeter shape, the spool base having an upper flange spaced upwardly from the lower flange, the upper flange extending radially outward from the central shaft, the upper flange having a circular perimeter shape, the spool base having a locking pin mounted to an upper surface of the upper flange at a location spaced from the central shaft, the locking pin extending parallel to the central shaft, an upper portion of the spool base adjacent the upper end of the spool base having external threads thereon;

a cam for determining a shape to be cut into the surface, the cam being removably mounted on the central shaft of the spool base, the cam having a central passage through which the central shaft is received, the cam having a secondary passage spaced radially outward from the central passage for receiving the locking pin of the spool base when the cam is positioned adjacent to the upper surface of the upper flange of the spool base, the cam having a profile surface corresponding to a shape to be cut into the surface;

a spool grip receiving the spool base, the spool grip having an elongate sleeve with an upper end and a lower end, the sleeve having a central aperture for receiving the central shaft of the spool base, the spool grip at the lower end of the spool grip having a cavity for receiving the locking pin of the spool base, the spool grip having a lower flange at the lower end of the sleeve for resting on the cam, the lower flange extending radially outward from the sleeve and having a circular perimeter shape, the spool grip having an upper flange extending radially outward from the sleeve and having a circular perimeter shape;

a nut removably secured to the upper end of the central shaft of the spool base for holding the cam and spool grip to the spool base;

an arm assembly removably and rotatably mounted on the post assembly, the arm assembly comprising:

a central tube member mounted to the post assembly, the central tube having a lumen receiving and riding on the flanges of the spool base and the spool grip such that the tube member is rotatable about the flanges;

an arm having an elongate shape with an inner end and an outer end, the inner end of the arm being mounted to an outer surface of the tube member;

a rod mounted on the arm in a substantially parallel orientation to the arm, the rod being mounted to permit axial movement of the rod with respect to the arm, the rod having an inner end and an outer end, the rod being mounted to the arm by a support, the rod having a stop mounted thereon at a location between the inner and outer ends;

a cam follower mounted on the inner end of the rod, the cam follower abutting against the profile surface of the cam such that the rod is axially movable by the profile surface of the cam as the arm assembly is rotated around the post assembly;

a biasing member for biasing the rod axially inward toward and into contact with the profile surface of the cam, the biasing member comprising a compression spring mounted between the stop on the rod and the support, the spring having the rod passing through the spring;

a carriage mounted on the rod in a manner permitting sliding movement of the carriage in an axial direction along the rod, the carriage having a channel through which the rod slidably extends;

a locking screw threadedly mounted on the carriage and being adapted for bearing against the rod for locking the carriage against axial movement relative to the rod, the locking screw having a knob thereon for permitting finger rotation of the locking screw;

a blade holder mounted on the carriage, the blade holder having a blade removably mounted thereon, the blade holder being rotatably mounted on the carriage for permitting rotation of the orientation of the blade, the blade holder having a pivot pin rotatably extending into a hole in the carriage, the blade holder having a blade directional knob for permitting finger pivoting of the blade holder on the pivot pin;

a blade safety cap removably mountable on the blade for protecting a cutting edge of the blade from unintentional contact with the cutting edge; and wherein the cam has a profile shape selected from the group consisting of a heart, a circle, an oval, a square, a star, a pentagon, a triangle, and a diamond.

* * * * *